United States Patent [19]

Wojcik et al.

[11] Patent Number: 4,754,331
[45] Date of Patent: Jun. 28, 1988

[54] DIGITIZER FOR AN IMAGE PROCESSING SYSTEM

[75] Inventors: David R. Wojcik, Woburn; Steven R. Goncalo, Burlington, both of Mass.

[73] Assignee: Litton Systems, Inc., Lexington, Mass.

[21] Appl. No.: 568,027

[22] Filed: Jan. 4, 1984

[51] Int. Cl.[4] ............................................. H04N 5/14
[52] U.S. Cl. .................................... 358/160; 358/140
[58] Field of Search ................. 358/140, 214, 11, 111, 358/160; 378/99

[56] References Cited

U.S. PATENT DOCUMENTS

| | | | |
|---|---|---|---|
| 4,125,862 | 11/1978 | Catano | 358/140 |
| 4,134,128 | 1/1979 | Hurst | 358/22 |
| 4,148,870 | 4/1979 | Taylor | 358/160 |
| 4,218,710 | 8/1980 | Kashigi et al. | 358/183 |
| 4,245,252 | 1/1981 | Nagumo | 358/213 |
| 4,393,402 | 7/1983 | Keyes et al. | 378/99 |
| 4,476,493 | 10/1984 | Poetsch et al. | 358/214 |
| 4,539,593 | 9/1985 | Jutier et al. | 358/160 |

FOREIGN PATENT DOCUMENTS

| | | |
|---|---|---|
| 0371299 | 6/1983 | Austria . |
| 2712025 | 6/1978 | Fed. Rep. of Germany . |
| 2919493 | 11/1979 | Fed. Rep. of Germany . |
| 3332284 | 3/1984 | Fed. Rep. of Germany ...... 358/111 |
| 2090502 | 7/1982 | United Kingdom . |

Primary Examiner—Edward L. Coles, Sr.
Assistant Examiner—David E. Harvey
Attorney, Agent, or Firm—Michael H. Wallach; Robert F. Rotella

[57] ABSTRACT

An analog video signal obtained from a television camera having a 4:3 aspect ratio is converted into a square array of N×N square pixels corresponding to the pixel content in the center of the television camera by apparatus which includes an analog-to-digital converter having as its analog input the analog output signal of the television camera and providing a sampled digital data output, the converter having an encode input and a data-ready output in addition to its analog video input and digital data output; a synchronization recovery circuit coupled to the video input and adapted to extract from the composite signal a composite synchronization signal containing line synchronization information, frame synchronization information and field index information, and an interface circuit coupled to the encode input of the analog-to-digital converter and the data-ready output and receiving the data output of the converter for converting the 4:3 aspect ratio of the television camera into a square image corresponding to a square in the center of the screen containing a square array of N by N square pixels.

12 Claims, 4 Drawing Sheets

DIGITIZER FOR AN IMAGE PROCESSING SYSTEM

BACKGROUND OF THE INVENTION

This invention relates to digital image processing, in general, and more particularly, to an improved method and apparatus for interfacing a digital image processor with an analog video input and output.

In various types of image processing systems such as the fluoroscopic system described in application Ser. No. 568,013, filed on even data herewith, there is a need to convert data from one of more types of analog video signals to digital format and, after processing, convert back to analog format. Particular problems arise when it is desired to operate on square pixels (i.e., picture elements which make up an image with a square aspect ratio) when receiving inputs from a device having a rectangular aspect ratio format and also in operating with elements of the image processing system which cannot operate at the same speed as the incoming input data rate.

As disclosed in the above application, the interlaced configuration in a standard television camera has an aspect ratio of 4:3, i.e., the frame width is four (4) units wide and the frame height is three (3) units high. A sequential scan camera on the other hand normally has a 1:1 aspect ratio, i.e., it displays a square picture. It is desirable to process video signals that represent square pictures and square pixels of the image (i.e., square aspect ratio signals). Typically, cameras will utilize an image intensifier tube, which is generally circular and does not have an aspect ratio of 4:3, for image enhancement. In such case, when a conventional television camera with an interlaced scan and 4:3 aspect ratio views an image via an image intensifier tube, the image will be contained within a square in the middle of the television camera screen or raster.

If one considers a line of pixels on a television raster with a 4:3 aspect ratio and 512 lines of vertical resolution, the number of square pixels generated across each line will be approximately 4/3 times 512 or 682 pixels. The image information, however, will be contained only within the 512 pixels in each line in the center of the screen on which the circular image intensifier image is located. Thus, in converting the analog video signal of the image when it is obtained from a conventional interlaced camera, there should be a delay at the beginning and end of each horizontal scan. For example, data conversion should start only after pixel number 85 is reached and continue for 511 additional pixels to pixel number 597. This yields digital data representing a 512 by 512 array of square pixels. Similar delays have to be introduced when converting the data back into analog format, i.e., only in the area between and including pixel 86 and pixel 597 should video information be reconverted.

Secondly, there is a certain amount of time alloted for scanning across a line and converting data for 512 pixels at a basic horizontal frequency for an image processing system of 10 MHz, for example, plus a time for retrace. When scanning with a camera having a 4:3 aspect ratio, one and one-third as many pixels must be scanned in this time. Thus, it is necessary to accelerate the rate of data conversion by four-thirds in order to scan 512 pixels in the center portion of the screen within the alloted time. For this reason, at the input, and again at the output, a clock accelerator is necessary to carry out the required acceleration for the 4:3 aspect ratio of the input and the display output.

Finally, it is difficult with presently available hardware to carry out frame processing in the frame processors of an image processing system at 10 MHz. Since there is a considerable amount of time utilized in retrace in a scanning corresponding to a data conversion at 10 MHz, it becomes useful to utilize this time for computation within the frame processors. Consequently, information can be operated on continuously in the frame processors at a lower frequency.

SUMMARY OF THE INVENTION

The present invention provides apparatus which performs the functions of converting video data from an analog to a digital format and back again, converting or processing the images of the data from rectangular to square format and back again and of doing necessary frequency conversion. Basically, the digitizer of the present invention includes logic circuits which can key one of two oscillators to cause an analog-to-digital converter to convert the analog video signal to digital data at either a 10 MHz rate or a 13 MHz rate. The 10 MHz rate corresponds to the rate necessary to convert a square aspect ratio signal, and the 13 MHz, which is approximately 4/3 of the 10 MHz rate, used to convert a 4:3 aspect ratio signal. As a result of the higher data conversion rate for the 4:3 aspect ratio signal, a number of pixels corresponding to the number of lines can be scanned in for data conversion over the time required to scan that number for a square aspect ratio input, the pixels being those in a square at the center of the raster. The information read in at one of these rates is coupled through a buffer memory with data read in in bursts and read out at a constant system rate reduced still further to 8.33 MHz for further processing by the image processing system. Considering the basic frequency of the image processing system to be 10 MHz, the 8.33 MHz processing frequency is possible because of the time during blanking when retrace takes place on the raster.

Converting digital data back into an analog video signal is done much in the same manner. The processed information at a system frequency of, for example, 10 MHz is read into another buffer memory and then read out of this buffer memory at the accelerated frequency of 13 MHz, again, in bursts with the time between bursts corresponding to blanking and retrace. A separate RS-170 timing generator generates the necessary sync and blanking signals based on divided outputs from a 10 MHz oscillator. At both the input and output, pixel and line counters and end-of-line and end-of-field detectors are utilized in controlling reading and writing into a display of the image processing system system.

BRIEF DESCRIPTION OF THE DRAWINGS

FIGS. 2, 2A, 2B, and 2C are block diagrams of a digitizer interface of the digitizer of FIG. 1 shown as three sections;

FIG. 2A is a block diagram of a first section of the digitizer interface of FIG. 2 basically showing analog-to-digital conversion control elements;

DETAILED DESCRIPTION

The basic purpose of the digitizer and digitizer interface is to take information in analog format from a television camera or to take information from another source or a test pattern and get into a form in which it can be processed by the frame processors of the image processing system, i.e., to get it at the proper frequency and with the proper synchronization signals. In addition, the digitizer interface takes the processed digital data which is being input to the digitizer interface at the system frequency of 8.33 MHz and converts it into the necessary output frequency of 13 MHz to display on a conventional T.V. display which has a 4:3 aspect ratio.

Figure 1:
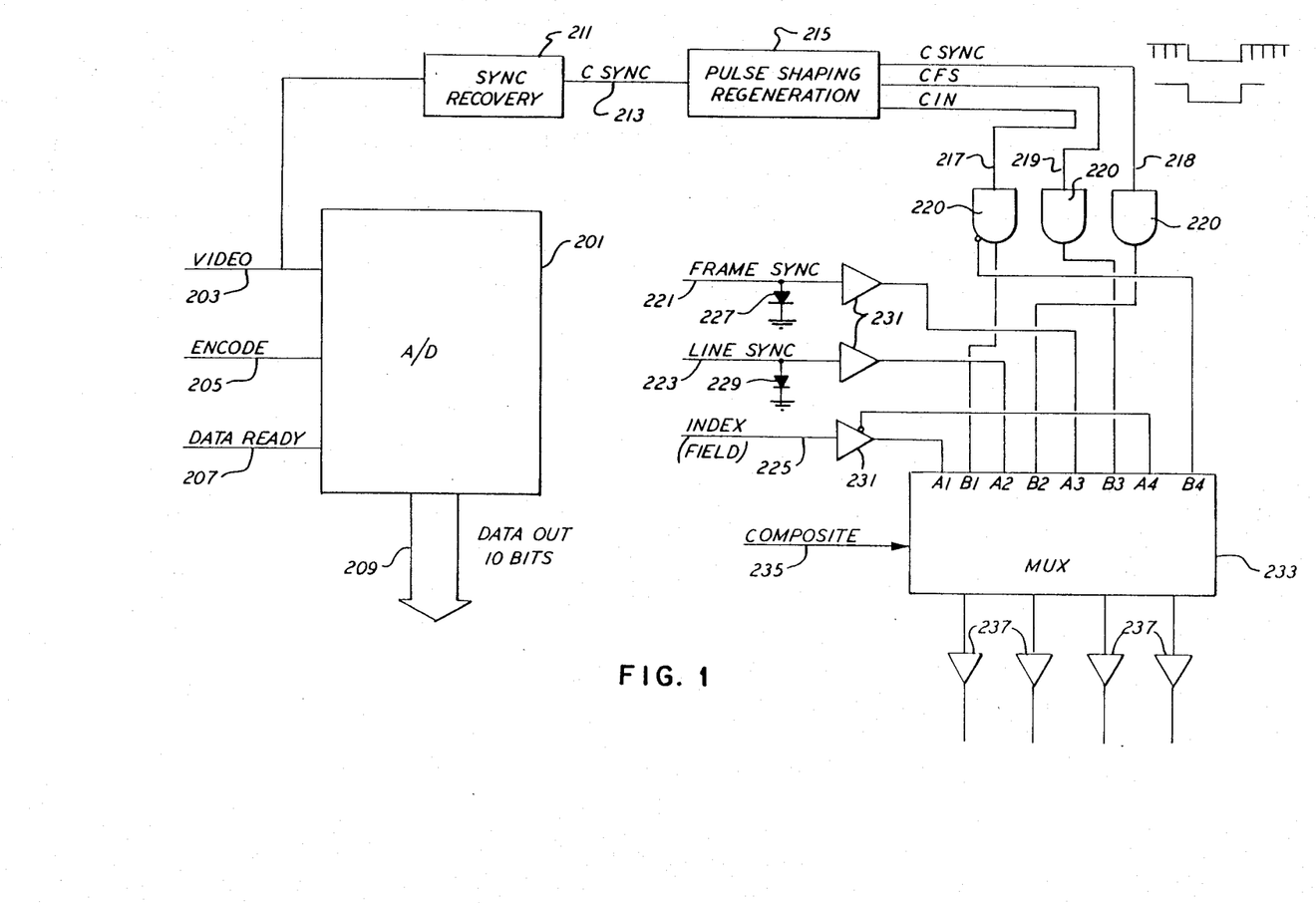
FIG. 1 is a block diagram of the digitizer of the present invention.

FIG. 1 is a block diagram of the digitizer. At the heart of the digitizer is an analog-to-digital converter 201 receiving a video input on line 203 from either an interlaced camera or a sequential scan camera. An input on line 205 is an encode command to the converter and an output on line 207 a data-ready output. A digital data output of 10 bits of data is provided on a data bus 209. The converter may be an Analog Devices Model 1020 for example. In addition to converting the video information, the digitizer also includes a sync recovery circuit 211. The video signal, assuming that an interlaced scan with composite sync in the video signal is provided, is coupled into a sync recovery circuit 211 of conventional design where the sync is separated out from the video to provide a composite sync signal on line 213. This composite sync signal is coupled to a pulse shaping and regeneration circuit 215 made up, primarily, of a group of monostable multivibrators from which three signals are provided as outputs. The first is the composite sync C SYNC on line 218 which will include both a vertical and horizontal sync information, a signal labeled CFS on line 219 which is the frame sync and a signal designated CIN on line 217 which is a short pulse occurring at the field-time, i.e., occurring at the division between odd and even fields. Each of lines 217–219 is provided to a respective AND gate 220.

As indicated above, the image processing system must also work with a sequential scan camera. Such a camera provides as outputs a frame sync signal which is an input on line 221, a line sync signal which is an input on line 223 and a frame index signal which is an input on line 225. Lines 221 and 223 are clamped by zener diodes 227 and 229, respectively. Each of the three lines is coupled into a line receiver and driver 231 having uninverted and inverted outputs.

To select between either the recovered sync from the pulse shaping and regeneration circuit in the case of interlaced scan or incoming signals on lines 221, 223 and 225 in the case of sequential scan, a multiplexer 233 is provided. The inverted index signal and the inverted CIN signal from a gate 220 are provided to one set of inputs. The frame sync signal and CFS signal are provided to another set of signals inputs. The composite sync and line sync are provided to a third set of inputs and the index signal and not inverted CIN signal to the fourth set of inputs. One of the two sets of inputs is selected in accordance with a command labeled "composite" on line 235. When composite video is present, i.e., when interlaced scan is being used, this signal will cause the outputs of pulse shaping and regeneration circuit 215 to be used. Where a sequential scan camera is used, it will cause the signals on lines 221, 223 and 225 to be used. These signals are provided as outputs through line drivers 237 to the remainder of the image processing system.

Figures 2, 2A:
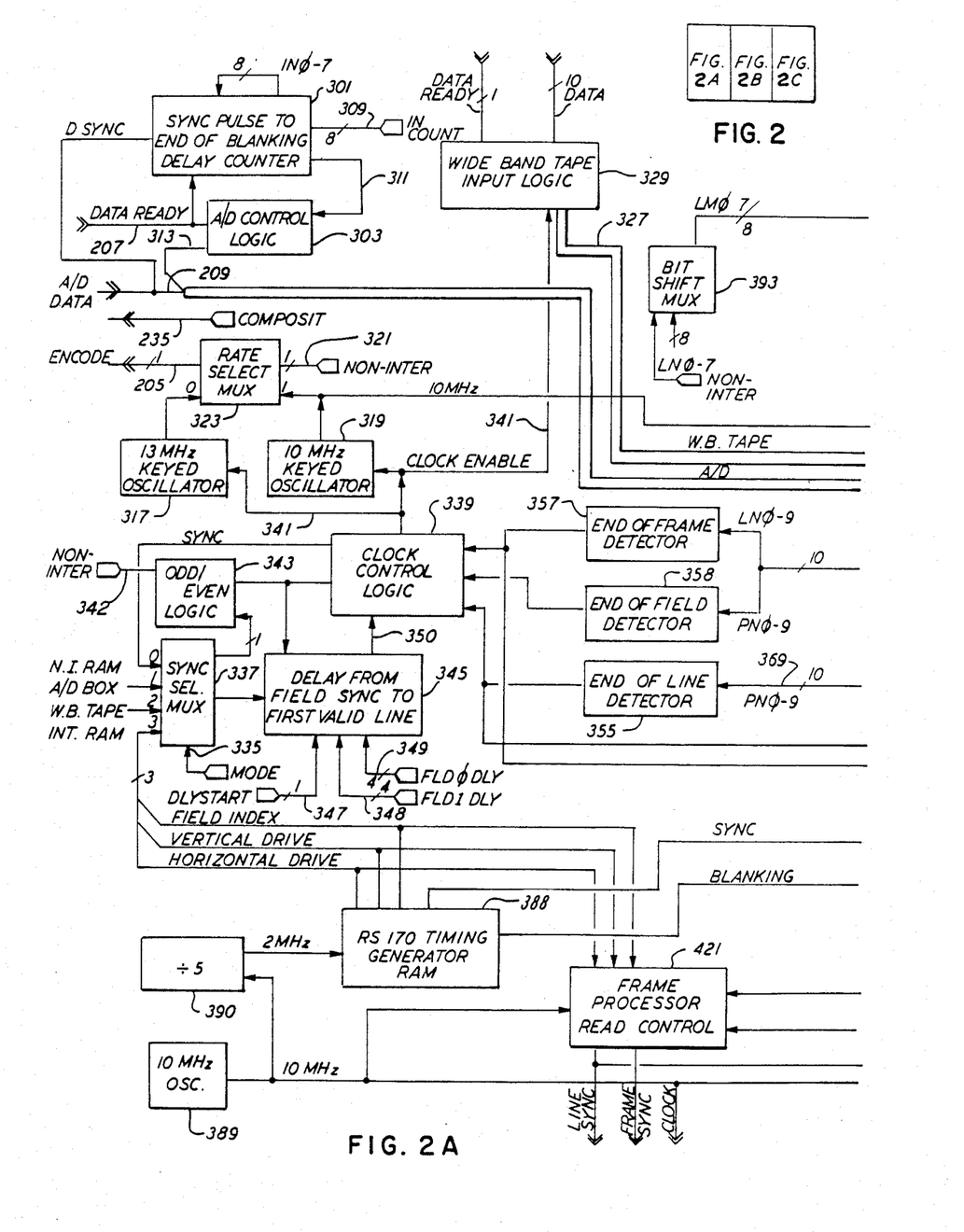

FIG. 2 is a block diagram of the digitizer interface shown as broken into three sections. This interface is actually more than a digitizer interface. It interfaces the image processing system not only with the digitizer but with an output real time output monitor provides test patterns (see FIG. 2B) and generates various types of control and synchronization signals for use throughout the system. It also does various types of input and output conversions and provides the output to an associated display of the system through a digital-to-analog converter (see FIG. 2C). Also included and used therein are DMA, i.e., Direct Memory Access, inputs from a host processor (not shown) which configure the system and set it up for the type of operation desired (see FIG. 2C).

Referring to the upper left-hand corner of FIG., 2A are located blocks 301 and 303. Block 301 is a sync-pulse to end of blanking delay counter. Block 303 is analog-to-digital converter control logic. A-D control logic 303 receives as one input the data-ready signal of the line 207. Adjacent line 207, bus 209, to which a signal from the logic circuit 303 is added, is visible. Adjacent that, the "composite" output which controls the multiplexer 233 of FIG. 1, on line 235 is visible. Directly below that line is the encode line 205 discussed above in connection with FIG. 1. The "composite" signal on line 235 is obtained from a control register 305 shown in FIG. 2C which receives an input from the DMA bus. When the control register is selected, by the signal labeled FNCT-4L, the values on the DMA bus are stored in the control register 305 providing control information for the interface. On the other hand, when signal FNCT-3L is present information is loaded into the address register 307 (FIG. 2C). This includes the words, "Incount" and "outcount" "Incount" indicates when it is time to begin inputting to the system, i.e., to begin using the input on bus 209 and processing it.

The data conversion in the analog-to-digital converter 201 of FIG. 1, was carried out in response to the encode signal 205. The encode signal consists of a pulse train having either a frequency of 13 MHz obtained from an oscillator 317 or 10 MHz obtained from an oscillator 319. Which of the two rates are provided on the line 205 is determined by the input designated "Noninter" on a line 321 to a rate select multiplexer 323. The reason for this is that, as explained above, if noninterlaced information is being provided, it is in a $512 \times 512$ pixel format, i.e., it has a 1:1 aspect ratio. The normal interlaced scan, however, has a 4:3 aspect ratio. Because of this, and since processing is done at the 10 MHz rate, the input rate must be accellerated by a ratio of 4/3 or to 13 MHz. Thus, to scan properly this higher frequency must be used but delay counter 301 must delay until the 85th pixel is reached as described in the

BACKGROUND OF THE INVENTION

Figure 2B:
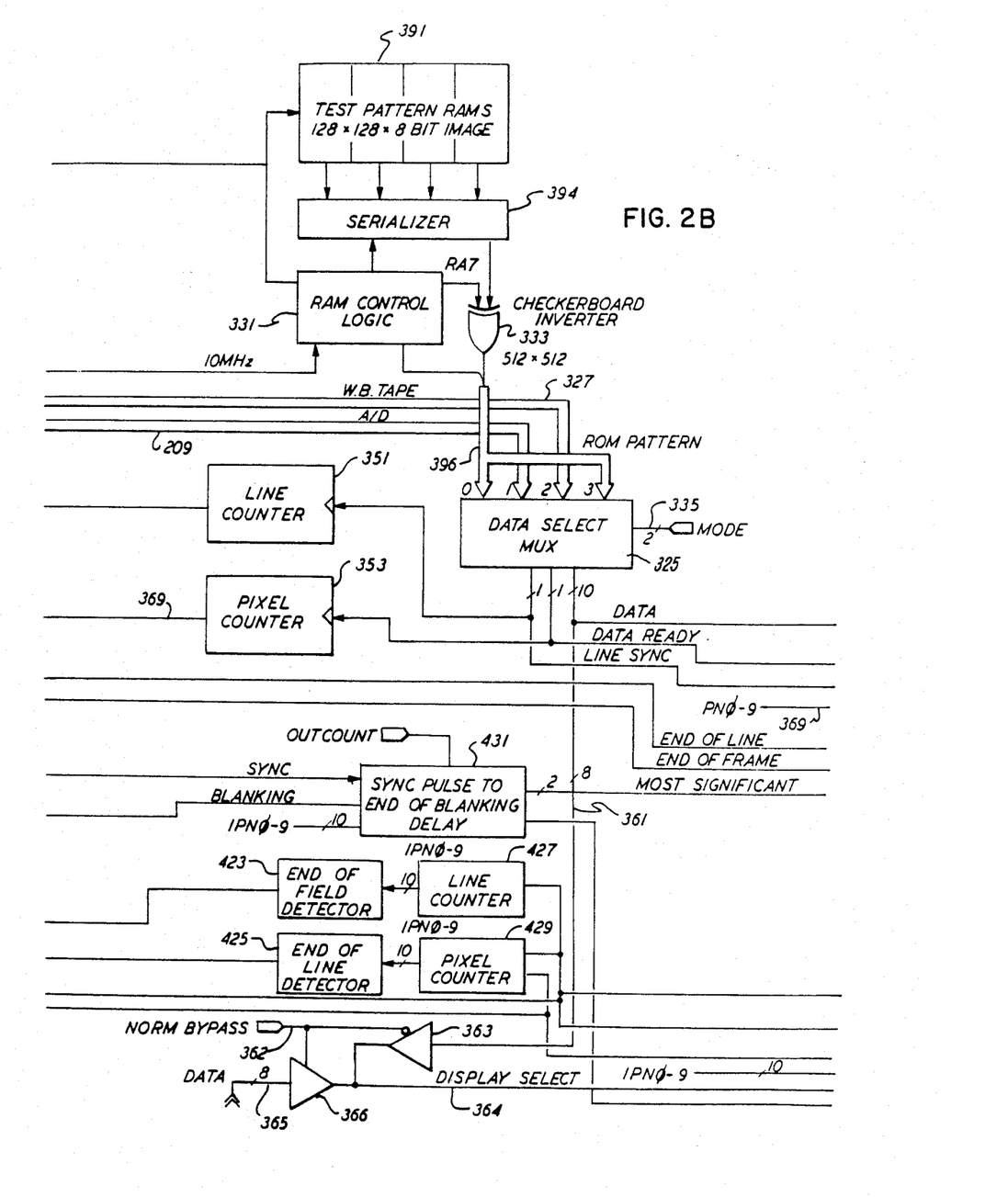
FIG. 2B is a block diagram of a second section of the digitizer interface of FIG. 2 basically showing a data select multiplexor, a test pattern generator and digital-to-analog conversion elements.
Figure 2C:
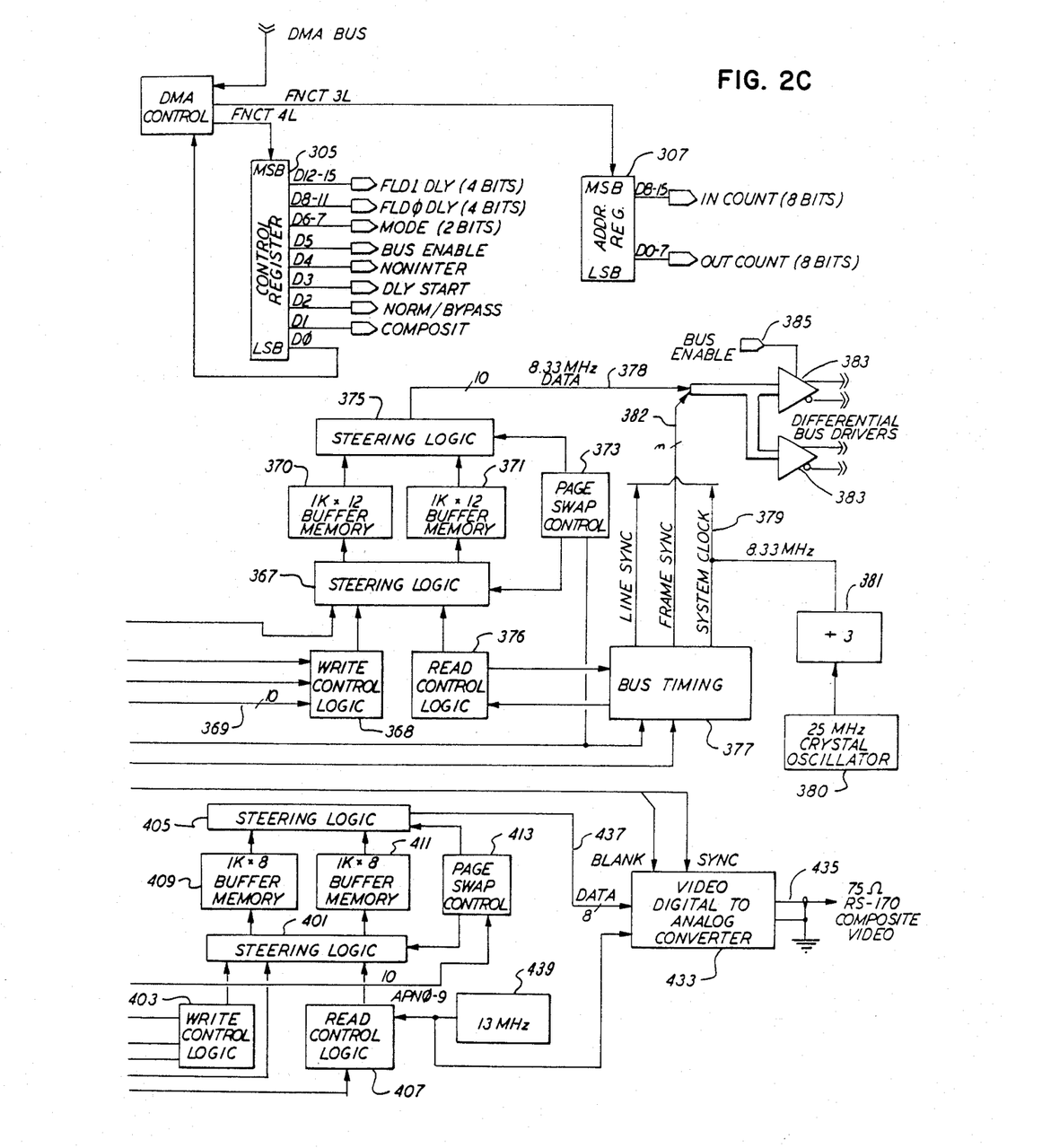
FIG. 2C is a block diagram of a third section of the digitizer interface of FIG. 2 basically showing a computer control element, buffer memory elements and output elements.

The data from the analog-to-digital converter 201 is provided as an input to a data select multiplexer 325 shown in FIG. 2B. The data select multiplexer 325 can select data from four separate inputs. One input, bus 209 is coupled to the analog-to-digital converter and a second 327 is coupled to a spare external input 329. Third and fourth buses are coupled on line 396 to RAM control logic 331 and an exclusive OR gate checker board inverter 333. Which of the inputs is selected is determined by a two bit control signal from control register 305 called "mode" which is provided as an input to the multiplexer 325 on line 335. The "mode" input of line 335 is also an input to a sync-select multiplexer 337 at the middle left-hand side of FIG. 2A. The sync-select multiplexer 337 has four, three line inputs. These are, respectively, a noninterlace RAM input, an analog-to-digital input, a spare external input and an interlace RAM input. In the case of the analog-to-digital converter, 201 being selected by the data select multiplexor 325, the inputs to the sync-select multiplexor 337 are the outputs from drivers 237 described in connection with FIG. 1 (Note that the inverted signals are not utilized).

To perform the major function of the digitizer interface (i.e., rectangular to square format image conversion), the analog-to-digital converter must be selected by the data select multiplexer 325. The 10 MHz oscillator 319 and 13 MHz oscillator 317 are controlled by an output from clock control logic 339 on line 341 shown in FIG. 2A. This determines when these keyed oscillators are turned on and turned off to read in data. Which of these is selected will, of course, be determined by whether or not there is a interlaced or noninterlaced input. Thus, the noninterlaced control signal from control register 305 is provided on a line 342 into an odd-/even logic block 343 where it is combined with a first output of the sync-select multiplexer, the output corresponding to the index signal or representing field switchover. The field sync and line sync are provided as inputs to a block 345 labeled "delay from field sync to first valid line." This is a delay which is controlled by additional control signals from control register 305 on lines 347, 348 and 349 labeled "delay to start", "field zero delay" and "field one delay," the last two representing the even-and-odd field delays, respectively. These are delays which are programmable through the host processor (not shown) and the control register 305, each having four bits of data to take into account system delays. Thus, in dependence on these inputs, there is a start delay and a delay in each of the two separate fields. At the required time after the desired delay, an output signal is provided to clock-control logic 339 on line 350.

As indicated, an output of the A-D control logic 303 on line 313 is added on to the 10 bit bus 209. This is, in effect, a signal at the pixel or data rate and corresponds, in frequency, to the data-ready signal on line 207. Also provided onto the bus 209 and through the data select multiplexer 325 is the line sync signal. For a video input, the line sync is the signal "DSYNC" which is delayed to take into account the delay necessary in converting to a square image. These line sycn and pixel rate signals out of the multiplexer 325 are provided, respectively, to a line counter 351 and a pixel counter 353 (FIG. 2B). The output of the pixel counter 353 is provided to an end-of-line detector 355 via bus 369 and the outputs of the line counter 351 to an end-of-frame detector 357 and an end-of-field detector 358 (FIG. 2A). The outputs of each of these detectors provide inputs to the clock control logic 339. Thus, the clock control logic, having enabled the necessary oscillator 317 or 319 after the programmed delay, continues to enable the oscillator until the end of a line is reached. After the end of the line, there is a certain delay or retrace time. At the end of this time, the oscillator is, again, enabled. If interlace is in use, it is necessary to detect the end of the field for vertical retrace.

Similarly, it is necessary to detect the end of the frame whether it be interlaced or noninterlaced to allow for vertical retrace. Thus, the clock control logic uses the signals from the three detectors 355, 357 and 358, along with the delay control signals on line 350, to turn the oscillator 317 or 319 on and off to read the data in at the desired times and the desired rates. The data comes out of the multiplexer 325 on line 361. In one mode of operation known as "bypass" and controlled by a "normal/bypass" control signal from the control register 305 on line 362, the data is coupled directly through a series of drivers 363 to an output data bus 364 (FIG. 2B). A second input to this bus is on a bus 365 which is coupled through a driver 366 to the bus 364. This is the processed data input.

Normally, however, data is supplied to steering logic 367 under control of write control logic 368 which directs it into buffer member memories 370 and 371 (FIG. 2C). Data is alternately put into one memory or the other with the control of which memory is used done by means of a page swap control 373 which is driven by the end of line signal from end of line detector 355. The write control logic 368 receives the data ready signal and the line sync signal from the multiplexer 325. It also receives the output of the pixel counter 353 which is on a ten bit bus 369.

In the case of the interlaced camera input, as indicated above, delay counter 301 generates a pulse DSYNC which is the line sync signal received at write control logic 368. In the case of sequential scan this sync will not be delayed to the same extent to permit inputting data as soon as the line starts. In either case, the write control logic 368, responsive to this signal and to the pixel count on line 369, will cause 512 pixels to be read into the buffer memory 370 for each line. In the case of the interlaced scan these are read in at the rate of 13 MHz and in the case of sequential scan at the rate of 10 MHz. (A 1K memory is provided to allow expansion to 1024 lines of resolution).

The major portion of the remainder of the image processing system operates at 8.33 MHz to permit operating continuously and at a rate within the capabilities of available hardware. As shown in FIG. 2C, the system clock is generated by a 25 MHz crystal oscillator 380, the output of which is divided by 3 in a divide by 3 counter 381 to provide an 8.33 MHz system clock signal on line 379. This line along with the end of line and end of frame signals from detectors 355 and 357 are inputs to bus timing module 377. Bus timing logic outputs operate the read control logic 376 associated with the steering logic 367 and 375, the portion 375 being at the output of the buffer memories, to read out data on line 378. The reading out is done at the rate of 8.33 MHz. Read control logic 376 counts the number of pixels read out and provides the signal on line 379 as an input to bus timing 377. Basically, the data on line 378 is read out continuously at 8.33 MHz. It is possible to read it out at this slower rate because of the continuous reading. The input takes place in bursts because of the retrace in the case of the 10 MHz signal and the retrace and the accelerated input in the case of the 13 MHz signal. The 10 data lines 378 are combined with 3 synchronization lines, i.e., line sync, frame sync and system clock, on a bus 382 and provided as inputs to differential bus drivers 383 at least one of which is enabled by a bus enable signal 385 obtained from the control register 305.

The second function of the digitizer interface is activated by the first and fourth selections of the sync-select multiplexer 337 which are selections of the noninterlace RAM signal and the interlace RAM signal (see FIG. 2A). These are signals used for test purposes. In the case of the noninterlace RAM, the sync signals are derived from the clock control logic 339. In the case of the interlace RAM operation, the sync signals are obtained from an RS-170 timing generator RAM 388. RS-170 is a standard television interlace scan. A 10 MHz oscillator 389 provides an output into a divide by 5 counter 390, which then provides a 2 MHz addressing signal into the timing generator RAM 388. The RAM 388 in turn generates the field index, vertical drive and horizontal drive signals which are provided as inputs to the sync selector multiplexer 337 where they are selected and used in the output in the same manner as the sync signals from drivers 237 of the digitizer of FIG. 1.

Through provision of a control signal on line 341, the 10 MHz keyed oscillator 319 is turned on and provides an input into the RAM control logic 331 of FIG. 2B which provides address bits 2-6 to a test pattern RAM 391. This provides 5 bits of an 8 bit address. Additional bits of the address are provided by a bit shift multiplexer 393 (shown in FIG. 2A) having as inputs the outputs of line counter 351. When in the interlace mode, every other line is skipped. The selected RAM outputs are coupled through a serializer 394 and a checkerboard inverter 333 made up of exclusive OR gates to provide the data output. The second input to exclusive OR gates is the 7th bit output RA7 of the RAM control logic 331. The RAM 391 stores a 128×128 pixel patern. Thus, these patterns must alternate and are in a 4×4 matrix with adjacent patterns inverted by the checkerboard inverter 333.

In the case of non-interlaced operation, as indicated by the noninterlace control signal input to the bit shift multiplexer 393, every line in sucession is selected rather than every other line. In either case, the data finds its way to bus 396 and then through the data select multiplexer 325 after which it is treated in the manner described above for the digital data output of the A/D converter 201. By having both the non-interlace and interlace capability with the test pattern, the ability of the system to operate with either type of input can, thus, be tested.

The final function of the digitizer interface is in the conversion of processed digital information back into analog form for display. As noted previously (with respect to the "bypass" operation mode), this information appears on bus 364 (bottom, FIG. 2B) and may, in some cases, be simply the input information bypassing all processing. In any case, an arrangement very much like that used in providing input data into the frame processors is used in outputting it to a display (not shown). The data is coupled into steering logic 401 which is under the control of write control logic 403 (see FIG. 2C). Similarly, the output steering logic 405 is controlled by the read-control logic 407. The reading and writing is done into and out of buffer memories 409 and 411 with, again, a page swap control 413 provided. Operation is essentially as described above in connection with the buffer memories 370 and 371.

The timing is provided by a frame processor read control 421 shown in FIG. 2A, which also has as an input the output of the 10 MHz oscillator 389, delivering outputs of line sync and frame sync to the display and interlace frame processors. Frame processor read control 421 performs functions somewhat analogous to the clock-control logic 339 in that it relies on an end-of-field detector 423 and an end-of-line detector 425, both shown in FIG. 2B, in developing its line sync and frame sync signals. The detectors in turn are fed from a line counter 427 and a pixel counter 429, respectively. The line counter 427 counts line sync pulses from the frame processor read control 421. These line sync pulses are also used to enable the pixel counter 429. The pixel counter 429 counts 10 MHz pulses from the 10 MHz oscillator when enabled. The timing generator RAM 388 also provides sync and blanking outputs to a block 431 which is a sync pulse to end-of-blanking delay counter similar to block 301. Here, a control word "Outcount" obtained from the address register 307 (top, FIG. 2C) is utilized to establish the period between the sync pulse and end-of-blanking delay. This establishes the delay on the screen when going back into the 4:3 aspect ratio.

Another output of block 431, which is a 2-bit output, is provided as the two-most significant bit inputs to a digital-to-analog converter 433 (FIG. 2C) which provides composite video on video cable 435. The data into the converter 433 is provided on line 437 from steering logic 405. It is caused to convert at a rate of 13 MHz in response to an output from a 13 MHz clock 439, which also provides a clock input to the read control logic 407. Read control logic 407 also receives an output from the sync pulse to end-of-blanking delay counter 431, which effectively tells it when to start reading out. In other words, when the blanking delay is over, it is time to start outputting video information. In the interlace frame processors, the information was processed at a 8.33 MHz rate. Now, because of the 4:3 aspect ratio, the output must be read out at a 13 MHz rate to establish the proper 4:3 aspect ratio for the displayed image. Thus, the write control logic 403 receives as inputs the 10 bit output of pixel counter 429 which operates at the 8.33 MHz rate, then uses this information along with line sync to carry out the writing of data into the buffer memories 409 and 411.

DIGITIZER INTERFACE SOFTWARE CONTROL

The output function code definitions of a host processor or computer controlling the image processing system that apply are outlined below:

| Function Codes | Device Address |
| --- | --- |
| 0 - Undefined | 5 |
| 1 - Read Back Zeros | |
| 2 - Undefined | |
| 3 - Output First Control Word | |
| 4 - Output Second Control Word | |
| 5 - Undefined | |
| 6 - Undefined | |
| 7 - Board Select | |

Before any data is transferred to the digitizer interface it must be selected via the board select function with the appropriate device address.

Control

The digitizer interface (DI) is controlled by 2 control words (4 bytes) referred to simply as "first control word" and "second control word." These are the words stored in registers 305 and 307 described above. The functions controlled are as follows:

First Control Word (A) 8-bit value specifying the number of input pixels to be "ignored" by the digitizer at the start of each line. This value should only be used if the DI is in "camera" mode. It should be equal to 1 for a non-interlaced camera and 84 for an interlaced camera. (IN COUNT);

(B) 8-bit value indicating the number of input pulses to be "ignored" by the composite video generator (CVG) after the start of each line. This value is used to accomodate format and/or timing differences between the digital input and the video output. It is constant for any source/destination pair. (OUT COUNT).

These bytes are transferred to address register 307.

Second Control Word (A) 1-bit "composite" switch indicating to the digitizer whether input is composite sync and video signals (interlaced or RS170) vs separate sync and video (non-interlaced or progressive scan).

(B) 1-bit "normal" switch selecting normal vs bypass mode. In "normal" mode the digitizer interface output is sent to bus 1. In "bypass" mode, the digitizer interface output is sent directly to the CVG. "Bypass" should only be used with the "interlace test" mode. (See below).

(C) 1-bit "delay start" switch to enable the CVG to handle interlace data.

(D) 1-bit "interlace" switch indicating to DI whether or not input signal is interlaced.

(E) 2-bit "mode" selector allowing camera, external, or test modes of operation.

(F) 1-bit "bus 1 enable" switch output to bus 1.

(G) 4-bit 1's complement of value to be used as the "first field line delay counter" if "delay start" is enabled.

(H) 4-bit 1's complement of value to be used as the "last line delay counter" if "delay start" is enabled. These bits are held in control register 305.

Digitizer Interface First Control Word Format

| Number of Throw Away Pixels | Bits | | | | | | | |
|---|---|---|---|---|---|---|---|---|
| | 7 | 6 | 5 | 4 | 3 | 2 | 1 | 0 |
| 0 | 0 | 0 | 0 | 0 | 0 | 0 | 0 | 0 |
| . | | | | | | | | |
| . | | | | | | | | |
| 255 | 1 | 1 | 1 | 1 | 1 | 1 | 1 | 1 |

| Number of Clock Pulses | Bits | | | | | | | |
|---|---|---|---|---|---|---|---|---|
| | 15 | 14 | 13 | 12 | 11 | 10 | 9 | 8 |
| 0 | 0 | 0 | 0 | 0 | 0 | 0 | 0 | 0 |
| . | | | | | | | | |
| . | | | | | | | | |
| 255 | 1 | 1 | 1 | 1 | 1 | 1 | 1 | 1 |

Digitizer Interface Second Control Word Format

| Composite | Bit 1 |
|---|---|
| Separate Video And Sync | 0 |
| Composite Video And Sync | 1 |

| Norm/Bypass Into CVG | Bit 2 | Delay Start | Bit 3 |
|---|---|---|---|
| By-pass (Test) | 0 | Disable | 0 |
| Normal | 1 | Enable | 1 |

| Non-Interlace Mode | Bit 4 | Operation Mode | Bits 7 | 6 |
|---|---|---|---|---|
| Interlaced | 0 | Non-int. Test | 0 | 0 |
| Non-interlaced | 1 | Camera | 1 | 0 |
| | | External | 0 | 1 |
| | | Interlace Test | 1 | 1 |

| Bus 1 Enable | Bit 5 |
|---|---|
| Disable | 0 |
| Enable | 1 |

| 1st Field Line Delay Counter | Bits 11 | 10 | 9 | 8 | Last Field Line Delay Counter | Bits 15 | 14 | 13 | 12 |
|---|---|---|---|---|---|---|---|---|---|
| 15 | 0 | 0 | 0 | 0 | 15 | 0 | 0 | 0 | 0 |
| 14 | 0 | 0 | 0 | 1 | 14 | 0 | 0 | 0 | 1 |
| 13 | 0 | 0 | 1 | 0 | 13 | 0 | 0 | 1 | 0 |
| 12 | 0 | 0 | 1 | 1 | 12 | 0 | 0 | 1 | 1 |
| 11 | 0 | 1 | 0 | 0 | 11 | 0 | 1 | 0 | 0 |
| 10 | 0 | 1 | 0 | 1 | 10 | 0 | 1 | 0 | 1 |
| 9 | 0 | 1 | 1 | 0 | 9 | 0 | 1 | 1 | 0 |
| 8 | 0 | 1 | 1 | 1 | 8 | 0 | 1 | 1 | 1 |
| 7 | 1 | 0 | 0 | 0 | 7 | 1 | 0 | 0 | 0 |
| 6 | 1 | 0 | 0 | 1 | 6 | 1 | 0 | 0 | 1 |
| 5 | 1 | 0 | 1 | 0 | 5 | 1 | 0 | 1 | 0 |
| 4 | 1 | 0 | 1 | 1 | 4 | 1 | 0 | 1 | 1 |
| 3 | 1 | 1 | 0 | 0 | 3 | 1 | 1 | 0 | 0 |
| Not Used | 1 | 1 | 0 | 1 | Not Used | 1 | 1 | 0 | 1 |
| Not Used | 1 | 1 | 1 | 0 | Not Used | 1 | 1 | 1 | 0 |
| Not Used | 1 | 1 | 1 | 1 | Not Used | 1 | 1 | 1 | 1 |

What is claimed is:

1. Apparatus for digitizing an analog video output signal obtained from a television camera comprising:
   an analog-to-digital converter receiving at an analog input thereof the analog video output signal of the television camera and providing a sampled digital data signal at a digital output thereof;
   a synchronization recovery circuit coupled to receive the analog video output signal and adapted to extract from the analog video output signal a composite synchronization signal containing line synchronization information, frame synchronization information and field index information; and
   means coupled to said analog-to-digital converter and controlling said converter whereby when said video signal represents an X:Y aspect ratio format, where X is greater than Y, said analog-to-digital converter is controlled by said coupled means so as to convert said analog video signal representing the X:Y aspect ratio format into said sampled digital data signal representing a square aspect ratio format comprising an array of N×N pixels, the sampled digital data signal corresponding to a pixel content within the television camera screen, said coupled means comprising a system clock establishing a first pixel rate, buffer memory means having read and write control logic for storing lines of pixel information of the sampled digital data signal, means for writing, when said video signal represents the X:Y aspect ratio image format, said sampled digital data signal into said buffer memory means at a second pixel rate greater than said first pixel rate which allows scanning approximately XN/Y pixels across each line on the television camera screen in a line scan time necessary for scanning N pixels across each line at the first pixel rate, and means for reading said sampled digital data signal out of said buffer memory means continuously at the first pixel rate.

2. The apparatus recited in claim 1, wherein said analog-to-digital converter further comprises an encode input and said coupled means comprises means for providing encode signals to said encode input of said analog-to-digital converter for producing said sampled digital data signal and means for controlling the write control logic whereby said sampled digital data signal is written into said buffer memory means after approximately A pixels have been scanned for each line, where A is less than N, and writing said sampled digital data signal into said buffer memory means is stopped after N pixels have been stored in said buffer memory means for each line.

3. The apparatus recited in claim 2, wherein X is 4 and Y is 3 and N is approximately equal to 512, so that when said analog video signal represents the X:Y aspect ratio format the sampled digital data signal represents approximately a 512×512 pixel image which is produced from the analog video output signal representing an approximately 682×512 pixel image and said encode signals are provided to said analog-to-digital converter at a rate of approximately 13 MHz, and A is approximately 86 pixels.

4. The apparatus recited in claim 2, wherein when said analog video signal represents a square aspect ratio format, said coupled means controls said converter to convert said analog video output signal into said digital sampled data signal having said square aspect ratio format.

5. The apparatus recited in claim 4, wherein when the analog video signal represents said square aspect ratio format, said encode signals are provided to said analog-to-digital converter at a rate of 10 MHz.

6. The apparatus recited in claim 1, further comprising test pattern generator means and multiplexer means for carrying out a selection between data from said test pattern generator means and the sampled digital data signal from the digital output of said analog-to-digital converter, said multiplexer means having an output coupled to an input of said buffer memory means.

7. The apparatus recited in claim 6, wherein said analog video output signal comprises one of an interlaced or a non-interlaced scan, and wherein said test pattern generator means is adapted to generate test patterns both in interlaced and non-interlaced formats.

8. The apparatus recited in claim 1, wherein said sampled digital data signal is processed by a digital image processing system having a system frequency and further comprising means for reconverting said sampled digital data signal into a further analog video signal for display on a television display means, said means for reconverting comprising:
 timing generator means for generating synchronizing and blanking signals;
 further buffer memory means having read and write control logic;
 a video digital-to-analog converter having as inputs the output of said further buffer memory means and said blanking and synchronizing signals; and
 means for controlling said control logic of said further buffer memory means so as to write into said further buffer memory means at the system frequency and read out of said further buffer memory means at a higher frequency than the system frequency whereby said video digital-to-analog converter supplies said further analog video signal to said display means in an X:Y aspect ratio format.

9. The apparatus recited in claim 8, further comprising a by-pass connection whereby said sampled digital data signal can be directly coupled to said further buffer memory means.

10. The apparatus recited in claim 8 wherein said timing generator mean comprises an RS-170 timing generator.

11. A method for processing a first video information signal having an interlaced X:Y aspect ratio image format or a square aspect ratio image format Y:Y, where X is greater than Y, comprising the steps of:
 selectively digitizing each scan line of the first video information signal having said X:Y aspect ratio image format from a first point to a second point of each scan line at a first rate greater than a desired data conversion rate, said desired data conversion rate comprising a rate established when said first video information signal has said square aspect ratio image format Y:Y;
 storing the digitized information from said first point until said second point of each scan line, said first point being after the beginning of each line and said second point being before the end of each line;
 processing the digitized information at a rate which is less than or equal to said data conversion rate;
 after said step of processing, reconverting said digitized information into an analog video signal at said first rate and providing the reconverted analog video signal to a television monitor; and
 generating synchronization signals for said television monitor from a signal having said data conversion rate.

12. The method recited in claim 11 wherein X is 4 and Y is 3 and said first rate comprises 4/3 of said data conversion rate, said first point comprises 1/6 of each line and said second point comprises 5/6 of each line.

* * * * *